(12) United States Patent
Houssat et al.

(10) Patent No.: US 10,377,350 B2
(45) Date of Patent: Aug. 13, 2019

(54) ADAPTER USED IN A WIPING SYSTEM

(71) Applicant: Valeo Systèmes d'Essuyage, Le Mesnil Saint Denis (FR)

(72) Inventors: Stéphane Houssat, Blanzat (FR); Vincent Gaucher, Ennezat (FR); Eric Poton, Pont du Château (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/428,205

(22) Filed: Feb. 9, 2017

(65) Prior Publication Data

US 2017/0232936 A1 Aug. 17, 2017

(30) Foreign Application Priority Data

Feb. 12, 2016 (FR) ...................... 16 51135

(51) Int. Cl.
  *B60S 1/38* (2006.01)
  *B60S 1/40* (2006.01)

(52) U.S. Cl.
  CPC .............. *B60S 1/40* (2013.01); *B60S 1/3849* (2013.01); *B60S 1/4003* (2013.01); *B60S 1/4045* (2013.01); *B60S 1/4048* (2013.01); *B60S 2001/409* (2013.01); *B60S 2001/4051* (2013.01); *B60S 2001/4054* (2013.01)

(58) Field of Classification Search
  CPC .... B60S 1/3849; B60S 1/4038; B60S 1/4045; B60S 1/40; B60S 1/4009; B60S 1/4077; B60S 1/4003; B60S 1/4048; B60S 2001/4051; B60S 2001/4054; B60S 1/387; B60S 2001/409

USPC ...................................... 15/250.32
See application file for complete search history.

(56) References Cited

U.S. PATENT DOCUMENTS

| 2012/0054976 A1* | 3/2012 | Yang .................. B60S 1/3867 |
| | | 15/250.32 |
| 2013/0007977 A1 | 1/2013 | Depondt | |
| 2013/0212828 A1* | 8/2013 | Coughlin .............. B60S 1/3801 |
| | | 15/250.32 |
| 2015/0151718 A1* | 6/2015 | Moll .................... B60S 1/4048 |
| | | 15/250.32 |
| 2015/0197217 A1* | 7/2015 | Avsar ................... B60S 1/3867 |
| | | 15/250.32 |
| 2015/0274132 A1* | 10/2015 | Polocoser ............ B60S 1/4048 |
| | | 15/250.32 |

FOREIGN PATENT DOCUMENTS

| DE | 102011003838 | * | 7/2012 |
| WO | 2005/039944 | * | 9/2004 |

* cited by examiner

*Primary Examiner* — Gary K. Graham
(74) *Attorney, Agent, or Firm* — Osha Liang LLP

(57) ABSTRACT

The invention relates to an adapter 9 designed to be interposed between a connector 8 and an end portion of a drive arm, the adapter 9 including a first attachment member 32 designed to cooperate with a second attachment member 72 of the connector 8, the first attachment member 32 having at least one attachment wall arranged in a longitudinal plane of the adapter 9 and that bears a pivot shaft Ad of the connector 8, characterized in that the attachment wall has at least one recess 38c designed to receive a stiffening rib 70 of the connector 8.

12 Claims, 4 Drawing Sheets

Figure 1:
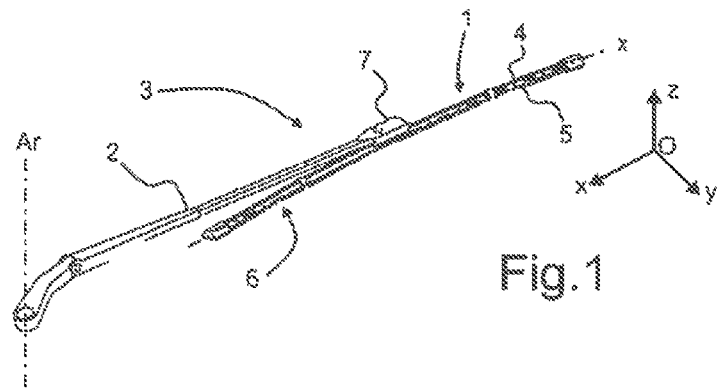

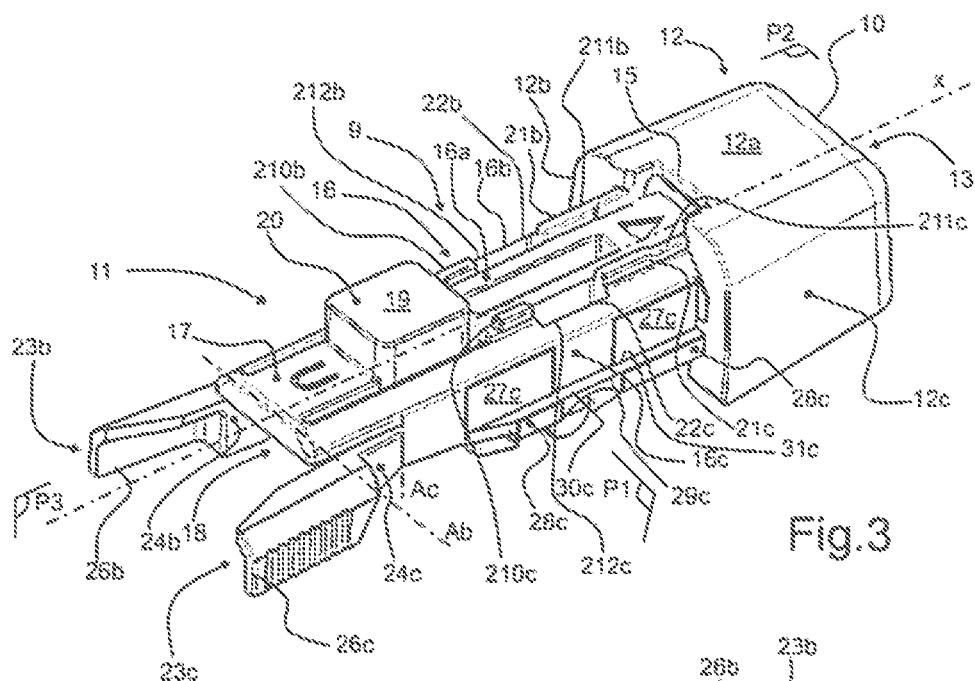
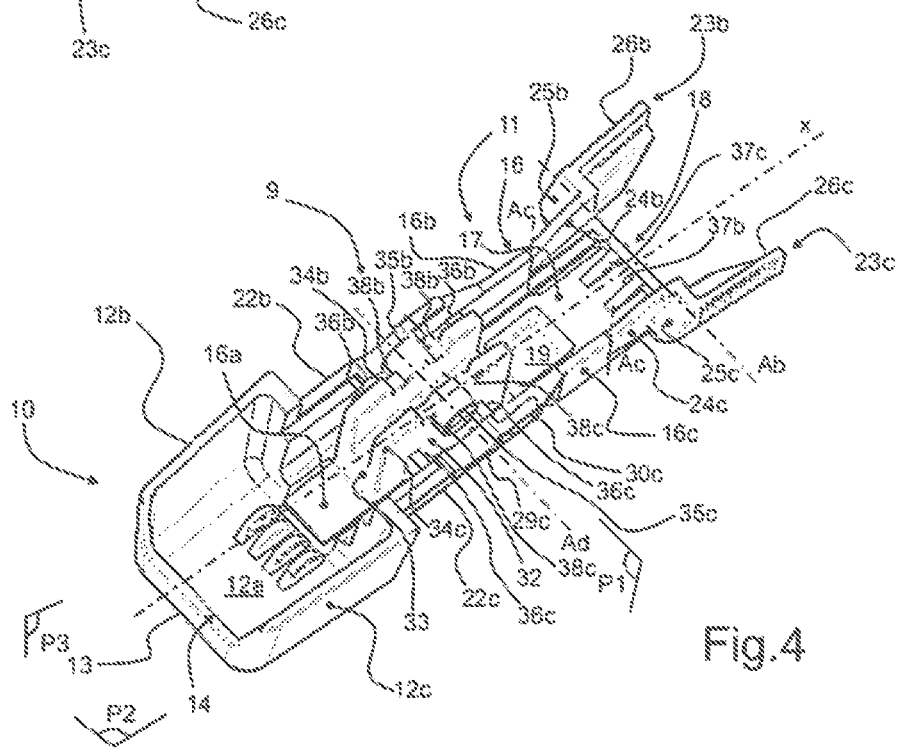

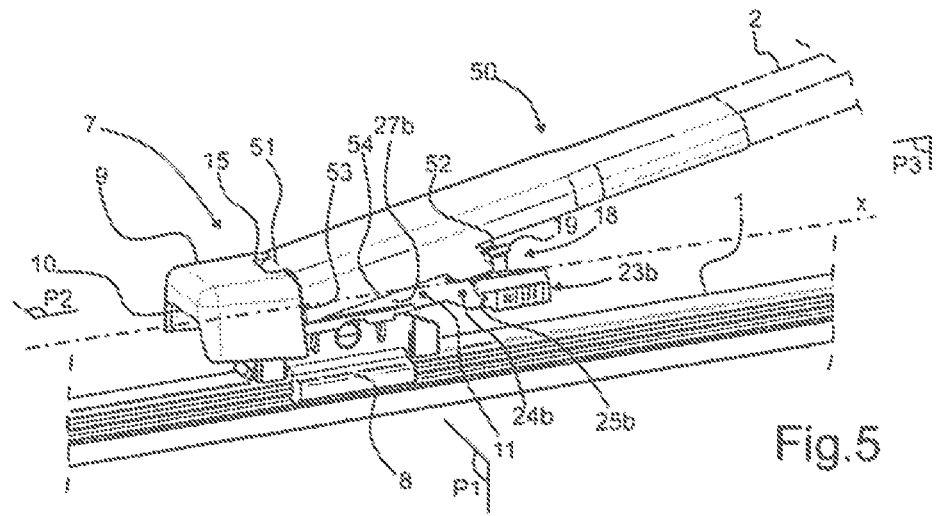

ADAPTER USED IN A WIPING SYSTEM

The present invention relates to wiping systems for motor vehicles, and more specifically to an adapter used in the wiping system.

A wiping system, commonly referred to as the windscreen wipers, for motor vehicles is designed to sweep away liquid and dirt that may obstruct the view of a driver of the motor vehicle of the surrounding environment. These windscreen wipers usually comprise a drive arm performing an angular to-and-fro movement about an axis of rotation, and an elongated wiper blade fitted with rubbers made of an elastic material. By rubbing against a front or rear glazed surface of the motor vehicle, the rubber sweeps away the water and some of the dirt from the driver's field of vision.

Regardless of the layout of the wiper blade, i.e. regardless of whether it is a wiper blade with articulated yokes that hold the rubber in several different zones, or a wiper blade with a metal strip that holds the rubber along the entire length of same, the wiper blade is attached at an end portion of the drive arm by means of a connection device that includes a connector rigidly attached to the wiper blade.

In a first known connection method, an adapter that is designed to be assembled with the connector of the wiper blade is mounted tiltingly about a fitting bolt on the end portion of the drive arm. This first connection method is commonly used for windscreen wipers designed for glazed surfaces located at the front of the motor vehicle. In a second known connection method, the connector is connected to a shaft rigidly connected to the drive arm. This second connection method is commonly found in windscreen wipers designed for glazed surfaces located at the rear of the motor vehicle.

A general problem found in the domain is the fact that the end portions come in a range of different shapes. Consequently, there is a demand for an adapter with a layout that enables attachment of the adapter to end portions of different shapes. Indeed, to facilitate referencing and storage operations, and to reduce manufacturing and maintenance costs for the wiping system, it is desirable to have a single adapter that is able to provide an assembly interface compatible firstly with the connector and secondly with the different shapes of the end portions of the drive arms. There is therefore a need for an adapter including a plurality of attachment means for different shapes of the end portion of the drive arm, said attachment means being simple and compact yet robust, and not altering an attachment member of the adapter to the connector carrying the wiper blade.

Furthermore, a specific problem lies in the fact that the connection device is liable to be subjected to forces along a vertical axis, i.e. an axis orthogonal to the longitudinal axis of the wiper blade and orthogonal to the fitting bolt between the connector and the adapter, such forces generating stresses on the adapter and/or the connector that may result in damage being cause to one or the other.

The closest prior art is represented by document US2013/0007977, which describes an attachment device including the connector carrying the wiper blade, and the adapter for connecting the connector to the drive arm. The adapter is designed to be interposed between the connector and the end portion of the drive arm, which may have a variety of different layouts. According to one embodiment, the adapter includes a single base element that has a flexible pad designed to be seated inside an opening formed through the end portion. The end portion includes side hooks that are designed to be engaged inside slots formed in the base element. According to another embodiment, the adapter also includes an intermediate part designed to be attached between the base element and the intermediate portion. The intermediate element is U-shaped and has an upper wall flanked by two side walls, the upper wall having a slot designed to receive a tab of the end portion, the side walls including orifices arranged to face one another to receive a shaft of the end portion.

Such an adapter is complex and includes a number of elements that it is desirable to reduce, while enabling a link between the connector and the end portion, which is likely to vary.

Furthermore, such an adapter is liable to be subjected to forces along the vertical axis, and includes no provision to prevent such forces from damaging the adapter and/or the connector.

Finally, it is desirable to be able to determine a maximum tilt angle of the connector about the fitting bolt of the adapter.

One objective of the present invention is to propose an attachment device that addresses the general problem and the specific problem and demand set out above.

The adapter according to the present invention is designed to be interposed between a connector and an end portion of a drive arm, the adapter including a first attachment member designed to cooperate with a second attachment member of the connector, the first attachment member having at least one attachment wall arranged in a longitudinal plane of the adapter and that bears a pivot shaft of the connecter, characterized in that the attachment wall has at least one recess designed to receive a stiffening rib of the connector.

The adapter advantageously includes any one of the following features taken individually or in combination:
- the recess is designed to receive an upper end that delimits the stiffening rib,
- the attachment wall has two recesses arranged on either side of the pivot shaft. If the adapter has two attachment walls, two recesses are provided for each wall,
- the recesses flank the pivot shaft. It is understood that, in this case, the recesses are in direct contact with the pivot shaft,
- the pivot shaft is formed by at least two strands respectively arranged on two attachment walls of the adapter. These strands are advantageously circular,
- the adapter may have a head with a front wall provided with a front notch, said notch enabling insertion of an air deflector fitted to the wiper blade,
- the adapter has a foot that has at least one flexible tab provided with a pad. This tab and this pad together form a retractable button. The foot is for example a longitudinal end of the body forming the adapter,
- the flexible tab is provided with at least one buttress extending at least between the flexible tab and the foot of the adapter,
- the longitudinal section of the buttress is triangular,
- the adapter includes at least one side tab that can tilt about a tilting axis that is perpendicular to a longitudinal axis of the adapter.

The invention is also intended to cover the combination of a wiper blade and an adapter, as described in the present document. This means that the adapter is not necessarily physically connected to the wiper blade in the invention. The invention relates to products sold on the after-sales market for cars in packages containing a wiper blade and at least one adapter according to the invention, and notably a plurality of adapters at least one of which is the adapter described in the present document.

The present invention also relates to an assembly formed by a connector and such an adapter, in which the recess forms a stop seat for a stiffening rib of the connector, notably an upper end of said rib.

The recess and the upper end of the stiffening rib advantageously form means for determining a tilt angle of the connector in relation to the adapter about an axis of rotation along which the pivot shaft extends.

The present invention also relates to a wiping system including an assembly such as the one described above, including a wiper blade statically attached to the connector and an end portion of a drive arm to which the adapter is affixed.

These provisions together ensure that the adapter is simple and comprises just one part, which enables a robust link between the connector and the end portion that is potentially variable. Such an adapter is also designed to withstand the forces exerted along a vertical axis on the wiping system. Finally, such an adapter is also designed to determine a maximum tilt angle of the connector about the fitting bolt of the adapter.

Figure 2:
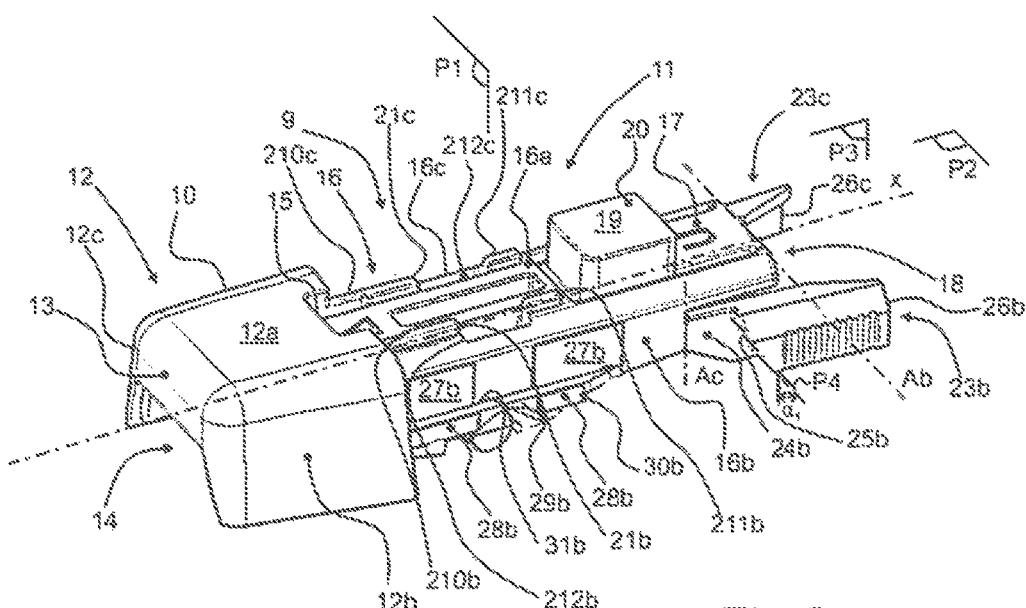
Figure 7:
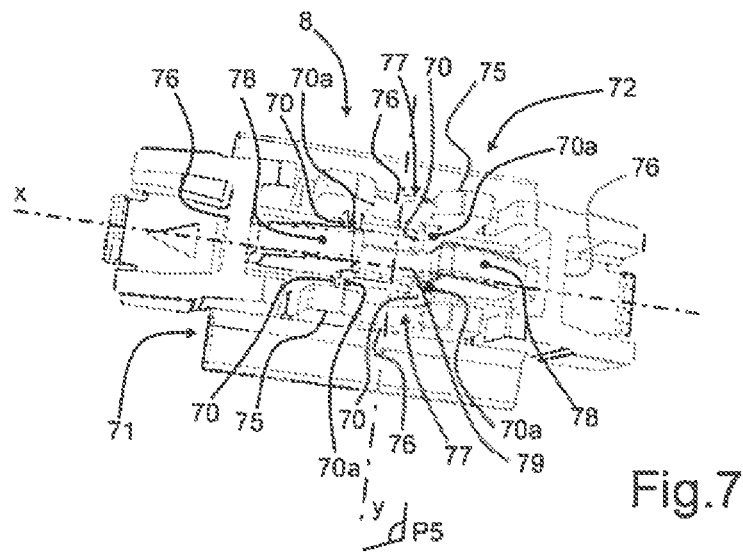
Figure 8:
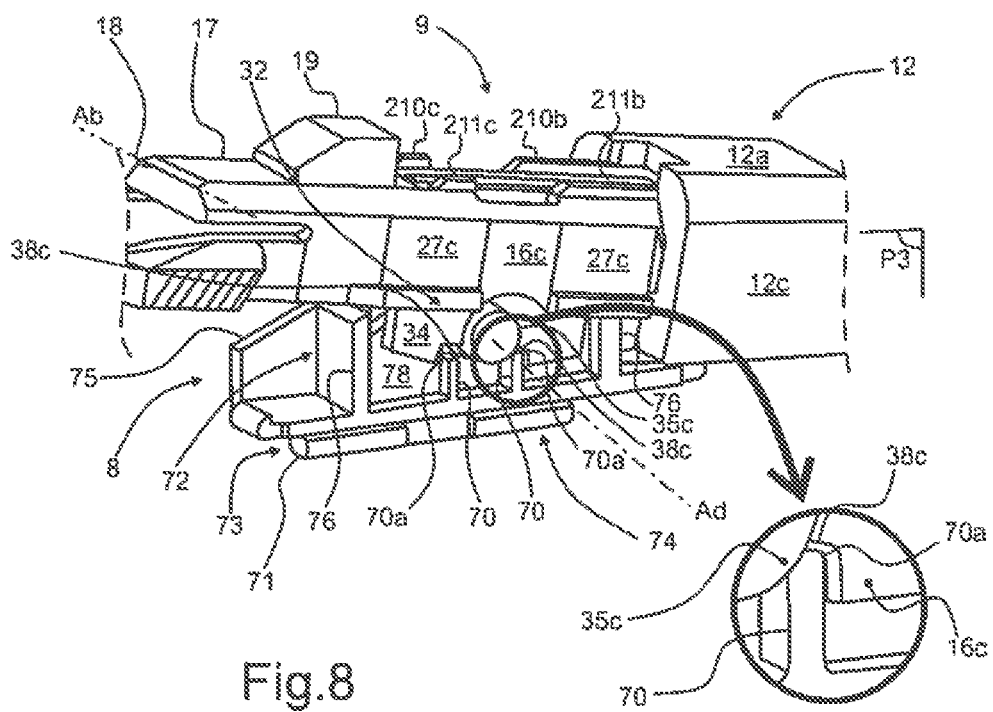

Other features, details and advantages of the invention are set out more clearly in the description given below by way of example and in relation to the drawings, in which:

FIG. 1 is a perspective view of a wiping system according to the invention,

FIG. 2 is a perspective side view of an adapter according to the present invention in the wiping system shown in FIG. 1, FIG. 3 is another perspective side view of the adapter shown in FIG. 2, FIG. 4 is a perspective bottom view of the adapter shown in FIGS. 2 and 3, FIG. 5 is a perspective view of the adapter shown in FIGS. 2 to 4 fitted with a connector carrying a wiper blade, the adapter being assembled with an end portion of a drive arm of a first type, FIG. 6 is a perspective view of the adapter shown in FIGS. 2 to 4 fitted with a connector carrying a wiper blade, the adapter being assembled with an end portion of a drive arm of a second type, FIG. 7 is a perspective top view of a connector in the wiping system shown in FIG. 1, FIG. 8 is a longitudinal cross section of the connector shown in FIG. 7 fitted with the adapter illustrated in FIGS. 5 and 6, FIG. 8 also showing a detail of the assembly of the connector and of the adapter.

In the figures, the terms longitudinal, side, transverse, vertical, top and bottom refer to the orientation of a wiper blade 1 shown in FIG. 1. A longitudinal direction corresponds to a longitudinal axis X along which the wiper blade 1 extends and/or along which the adapter according to the present invention extends. A transverse direction corresponds to the direction of a transverse axis Y that is perpendicular to the longitudinal axis X and to an axis of rotation $A_r$ of a drive arm 2 of a wiping system 3. A vertical direction, parallel to the direction of a vertical axis Z, and the terms upper or lower relate to orientations parallel to the axis of rotation $A_r$ of the drive arm 2 of the wiping system 3, the term tower containing the plane of the windscreen. For the longitudinal directions, the terms outer or inner refer to a pivot point of the wiper 1 on the drive arm 2 of the wiper blade 1, the term inner corresponding to the portion containing the drive arm 2 and one half blade, while the term outer corresponds to the portion containing the other half blade.

The directions mentioned above are shown in an orthonormal frame Oxyz shown in the figures. In this frame, the axis Ox represents the longitudinal direction, the axis Oy represents the transverse direction and the axis Oz represents the vertical direction.

In FIG. 1, a motor vehicle is typically fitted with a wiping system 3 to remove water and/or dirt from a glazed surface, notably a rear window of the motor vehicle. The wiping system 3 includes the drive arm 2, which is designed to perform an angular to-and-fro movement along and above the glazed surface. The glazed surface can equally be a windscreen or a rear screen fitted to the motor vehicle.

The wiping system 3 also includes the wiper blade 1 that extends along a main axis, referred to as the longitudinal axis X which is parallel to the axis Ox. The wiper blade 1 includes at least one air deflector 4 and one rubber 5. The air deflector 4 is designed to transform a pressure applied by an air flow circulating along the glazed surface into a bearing force of the wiper blade 1 against the glazed surface of the motor vehicle. The rubber 5 is the part of the wiper blade 1 that is in direct contact with the glazed surface, in order to remove water and/or dirt from this latter. The air deflector 4 and the rubber 5 form a semi-rigid assembly 6 that is carried by a connection device 7 interposed between the drive arm 2 and the semi-rigid assembly 6.

The connection device 7 provides a mechanical link between the drive arm 2 and the wiper blade 1, thereby enabling the wiper blade 1 to be separated from the drive arm 2 in order to replace the wiper blade 1. As a whole, the connection device 7 according to the present invention comprises a total of two parts, specifically a connector 8 and an adapter 9, shown together in FIGS. 5, 6 and 9. The connector 8 is designed to carry the wiper blade 1 and is mounted in rotation on the adapter 9, which can be attached to an end portion 50, 60 of the drive arm 2. The connector 8 extends longitudinally along the longitudinal axis X parallel to the axis Ox, i.e. parallel to the longitudinal axis of the wiper blade 1. According to another embodiment, the end portion 50, 60 is made by folding a metal strip, such as an aluminium sheet or similar. According to another embodiment, the end portion 50, 60 is made by moulding a synthetic material.

According to an embodiment of the invention, the connector 8 and the adapter 9 are made by moulding a polymer, for example a material from the polyoxymethylene (POM) family, or by moulding a mixture of polymers, for example a mixture of polymers from the polycarbonate and acrylonitrile butadiene styrene (ABS) families. Thus, the connector 8 and the adapter 9 are both one-piece parts.

In FIGS. 2 to 4, the adapter 9 extends along the longitudinal axis X and has a head 10 extending from a body 11, which abut one another along the longitudinal axis X.

The head 10 includes a head wall 12 that has a U-shaped cross section in a plane parallel to a transverse plane $P_1$, i.e. perpendicular to the longitudinal axis of the adapter. The head wall 12 has an upper head portion 12a and two side head portions 12b, 12c. The upper head portion 12a extends in a plane parallel to a longitudinal horizontal plane $P_2$, while the side head portions 12b, 12c are parallel to one another and extend in a respective plane parallel to a longitudinal vertical plane $P_3$. The transverse plane $P_1$ is parallel to the plane Oyz, the longitudinal horizontal plane $P_2$ is parallel to the plane Oxy and the longitudinal vertical plane $P_3$ is parallel to the plane Oxz. The head 10 also includes a front wall 13 that is substantially arranged in a plane parallel to the transverse plane $P_1$ and that joins the upper head portion 12a and the side head portions 12b, 12c together. The front wall 13 includes a front notch 14 enabling insertion of the wiper blade 1, by means of a rotational movement of the connector 8 in relation to the adapter 9. The upper head portion 12a includes a rear notch 15 that enables insertion of a front protuberance 51 of the end portion 50 of the first type shown in FIG. 5.

The body 11 includes a body wall 16 that is U-shaped in a cross-section made in a plane parallel to the transverse plane $P_1$. The body wall 16 includes an upper body portion 16a and two side body portions 16b, 16c. The upper body portion 16a extends in a plane parallel to the longitudinal horizontal plane $P_2$, while the side body portions 16b, 16c are parallel to one another and extend in a respective plane parallel to the longitudinal vertical plane $P_3$.

The upper body portion 16a has a flexible tab 17 that is mourned tiltingly on the upper body portion 16a about a tilting axis Ab. Preferably, the tilting axis Ab is arranged on a foot 18 of the body 11 that is arranged longitudinally opposite the head 13 of the adapter 9. The flexible tab 17 is provided with a pad 19 that emerges above the upper body portion 16a. The pad 19 is movable in rotation about the tilting axis Ab around a short path such that, at the beginning of the path, the pad 19 is substantially movable in translation within the transverse plane $P_1$ and the longitudinal vertical plane $P_3$. The pad 19 has a hearing face 20 that is arranged parallel to the longitudinal horizontal plane $P_2$, the bearing face 20 being designed to emerge through and above an opening 61 formed in the end portion 60 of the second type shown in FIG. 6. The pad 19 and the flexible tab of same form a retractable button that is used to retain the adapter 9 within a specific arm type.

The upper body portion 16a is provided with at least two longitudinal guide ramps 21b, 21c that are for example formed along a respective longitudinal edge 22b, 22c of the upper body portion 16a. The longitudinal guide ramps 21b, 21c are parallel with one another and extend along the longitudinal axis X. Each longitudinal guide ramp 21b, 21c is for example formed in a rib that emerges above the upper body portion 16a. The longitudinal guide ramps 21b, 21c are designed to guide the end portion 50, 60 of the drive arm 2 in a translational movement along the longitudinal axis X. Each of the longitudinal guide ramps 21b, 21c can comprise a discontinuous plurality of elementary longitudinal guide ramps 210b, 211b, 210c, 211c along the longitudinal axis X and in line with said longitudinal axis X. The first elementary longitudinal guide ramps 211b, 211c are arranged close to the pad 19, while the second elementary longitudinal guide ramps 210b, 210c are arranged close to the head 10. The first elementary longitudinal guide ramps 210b, 210c are respectively separated from the second elementary longitudinal guide ramps 211b, 211c by a first orifice 212b and a second orifice 212c that are formed through the upper body portion 16a.

Each side body portion 16b, 16c is provided with a side tab or flange 23b, 23c that is mounted on the side body portion 16b, 16c respectively and that can tilt about a tilting axis Ac. The tilting axis Ac is perpendicular to the tilting axis Ab and to the longitudinal axis X. Each side flange 23b, 23c includes a respective lateral upright 24b, 24c that is hinged on the side body portion 16b, 16c. The lateral uprights 24b, 24c lie in a plane parallel to the longitudinal vertical plane $P_3$. Each lateral upright 24b, 24c bears a respective transverse upright 25b, 25c that lies in a sliding, plane $P_4$ orthogonal to the longitudinal vertical plane $P_3$ and forms a first angle $\alpha_1$ with the tilting axis Ac of around 45°±10%, as shown in FIG. 2.

Each transverse upright 25b, 25c forms a sliding ramp for the respective transverse stops 52 of the end portion 50 of the first type shown in FIG. 5. Each transverse upright 25b, 25c has a respective longitudinal leg 26b, 26c lying in a plane parallel to the longitudinal vertical plane $P_3$. The longitudinal legs 26b, 26c form a longitudinal blocking member for the adapter in a first type of windscreen wiper arm.

The longitudinal legs 26b, 26c carry a member for gripping the adapter 9 to disengage the transverse stops 52 of the arm, as described below. For this purpose, the longitudinal legs 26b, 26c are for example provided with gripping reliefs, such as grooves or similar, on the external face of the longitudinal legs 26b, 26c.

Each side body portion 16b, 16c includes at least one first guide surface 27b, 27c of a respective side edge 53 of the end portion 50 of the first type illustrated in FIG. 5. Preferably, each side body portion 16b, 16c has a plurality of first guide surfaces 27b, 27c that are aligned with one another along the longitudinal axis X. Furthermore, each side body portion 16b, 16c includes at least one second guide surface 28b, 28c of a respective side edge 62 of the end portion 60 of the second type illustrated in FIG. 6. Preferably, each side body portion 16b, 16c has a plurality of second guide surfaces 28b, 28c that are aligned with one another along the longitudinal axis X. According to one embodiment, the first guide surfaces 27b, 27c and the second guide surfaces 28b, 28c overlap one another and lie within different but parallel planes, notably parallel to the longitudinal vertical plane $P_3$.

Also preferably, the first guide surfaces 27b, 27c and the second guide surfaces 28b, 28c are polished to facilitate sliding of the end portion 50, 60. According to a variant embodiment, the second guide surfaces 28b, 28c are arranged on a respective outer longitudinal face 29b, 29c of a longitudinal slot 30b, 30c in each side body portion 16b, 16c. Each longitudinal slot 30b, 30c has a horizontal longitudinal face 31b, 31c that lies in a plane parallel to the longitudinal horizontal plane $P_2$. Advantageously, each horizontal longitudinal face 31b, 31c forms a guide surface for a longitudinal edge 54 of the end portion 50 of the first type shown in FIG. 5.

In FIG. 4, the upper body portion 16a has a first attachment member 32 for the connector 8. The first attachment member 32 is designed to provide a mechanical link between the adapter 9 and the connector 8. The first attachment member 32 is carried by an internal face of the upper body portion 16a such that the first attachment member 32 is interposed between the side body portions 16b, 16c. The first attachment member 32 includes a base 33 that is carried by the internal face of the upper body portion 16a. In turn, the base 33 carries two attachment walls 34b, 34c that are parallel with one another and parallel to the longitudinal vertical plane $P_3$. Each attachment wall 34b, 34c has a respective strand 35b, 35c. The strands 35b, 35c lie along an axis Ad, referred to as the pivot shaft Ad of the adapter 9 on the connector 8. The pivot shaft Ad is notably parallel to the tilting axis Ab and orthogonal to the longitudinal vertical plane $P_3$. Advantageously, at least one reinforcing plate 36b, 36c is interposed between the side body portion 16b, 16c and the attachment wall 34b, 34c respectively to strengthen the adapter 9. Preferably and as shown, two reinforcing plates 36b, 36c are interposed between the side body portion 16b, 16c and the attachment wall 34b, 34c respectively. In this case, the reinforcing plates 36b, 36c are for example arranged on either side of the pivot shaft Ad.

The flexible tab 17 is preferably provided with at least one buttress 37b, 37c extending between the flexible tab 17 and the foot 18 of the adapter 9 to strengthen the flexible tab 17. There are preferably two buttresses 37b, 37c, as illustrated. The buttresses 37b, 37c have for example a triangular profile along a cross section taken along a plane parallel to the longitudinal vertical plane $P_3$.

At least one recess 38b, 38c is formed inside one of the attachment walls 34b, 34c to receive a corresponding upper end 70a of the stiffening ribs 70 of the connector 8, as shown in FIG. 8 and more specifically in the magnified portion of this figure. There are for example a plurality of recesses 38b, 38c formed in each of the attachment walls 34b, 34c. More specifically, there are a plurality of recesses 38b, 38c formed on either side of the pivot shaft Ad. In other words, in this case, each strand 35b, 35c is flanked by a pair of recesses 38b, 38c.

These arrangements are such that a tilt angle of the connector 8 on the adapter 9 is a function of the length of the recesses 38b, 38c measured along the longitudinal axis X between the strand 35b, 35c and a longitudinal end of the recesses 38b, 38c, as well as a longitudinal gap between the stiffening ribs 70. Alternatively or additionally, a depth of the recesses 38b, 38c measured along the vertical axis OZ determines the tilt angle between the connector 8 and the adapter 9. These arrangements are also such that the recesses 38b, 38c form stop seats for the upper ends 70a of the stiffening ribs 70 when a force is applied on the wiping system along the vertical axis Z. Such stops reduced the stresses liable to affect the strands 35b, 35c of the adapter 9 and/or the connector 8.

As shown in FIG. 7, the connector 8 extends along the longitudinal axis X of the wiper blade 1. The connector 8 has a base 71 that extends longitudinally and transversely, and a second attachment member 72 that extends substantially vertically above the base 71. The second attachment member 72 of the connector 8 is designed to cooperate with the first attachment member 32 of the adapter 9 to provide a robust and reliable mechanical link between the connector 8 and the adapter 9.

The base 71 includes means for attaching the connector 8 to the wiper blade 1. These attachment means are grooves 73 formed in the lower side portions of the base 71, each in one forming a hook 74 at the lower side portion of the base 71 that is designed to engage with the wiper blade 1.

The second attachment member 72, which is advantageously integral with the base 71, extends vertically above this latter. The second attachment member 72 has substantially vertical lateral flanks 75. Each of these lateral flanks 75 is substantially flat and thin in the transverse direction. The lateral flanks 75 thus together delimit an internal volume of the connector 8. Towards the longitudinal ends of the second attachment member 72, the lateral flanks 75 are joined together by at least one and preferably at least two reinforcing ribs 76 that notably strengthen the second attachment member 72.

A respective bearing 76 is formed through each of the lateral flanks 75 for the strands 35b, 35c of the adapter 9. Each of the bearings 76 is substantially cylindrical in shape and open, i.e. each bearing passes transversely through the entire thickness of each of the lateral flanks 75. The internal diameter of each of the bearings 76 is determined in relation to an average diameter of the strands 35b, 35c of the adapter 9 to which the connector 8 is designed to be connected. The centres of the two bearings 76 formed in the lateral flanks 75 are aligned with the transverse axis Y parallel to the direction of the axis Oy in the orthonormal frame defined above.

The transverse axis Y forms the axis of rotation of the wiper blade 1 in relation to the drive arm 2, once the strands 35b, 35c have been positioned inside the bearings 76 of the connector 8.

Each of the bearings 76 is substantially positioned, in the longitudinal direction, in the central zone of the corresponding lateral flank 75. According to the embodiment shown in FIGS. 7 and 8, the transverse axis Y with which the centres of these bearings 76 are aligned therefore lies within a transverse pane of symmetry $P_5$ of the connector 8. In the vertical direction, each of the bearings 76 advantageously lies substantially within the central zone of the second attachment member 72 of the connector 8. Each of these bearings 76 is therefore arranged, on either one of the lateral flanks 75, such as to firstly leave material of the corresponding lateral flank 75 above the bearing 76 and secondly to leave material of the corresponding lateral flank 75 beneath said bearing 76, between the lowest point of same and the upper face of the base 9 of the connector 8.

To enable the strands 35b, 35c of the adapter 9 to be received and held in the connector 8, i.e. for example simultaneously in the bearings 76 formed in the lateral flanks 75, an entry aperture 77 is formed level with each of the bearings 76, above these latter. The longitudinal dimension of each of the entry apertures 77 is less than the internal diameter of the bearing 76 to which the entry aperture 77 provides access, and into which the entry aperture 77 opens. In other words, each entry aperture 77 forms an access cane to the corresponding bearing 76. Thus, when the strands 35b, 35c of the adapter 9 are received simultaneously in the bearings 76, the strands 35b, 35c are subsequently held therein in the vertical direction Z.

The second attachment member 72 of the connector 8 also includes a guide cheek 78, within the internal volume delimited by the lateral flanks 75, extending substantially longitudinally and vertically from the upper face of the base 71. According to the embodiment shown in the figures, the guide cheek 78 is positioned, in the transverse direction, substantially in the mid-portion of the internal volume delimited by the two lateral flanks 75. The guide cheek 78 is also advantageously positioned substantially centrally in the longitudinal direction of the connector 8.

Substantially in the central portion of the longitudinal direction, a guide notch 79 is formed in the upper portion of the guide cheek 78. This guide notch 79 opens onto the upper surface of the guide cheek 78. More specifically, the guide notch 79 is arranged such as to form, in the lower portion of same, and approximate semi-cylinder centred on the transverse axis Y, the diameter of which is greater than the diameter of the bearings 76. According to the embodiment illustrated, this semi-cylindrical portion extends vertically towards the upper surface of the guide cheek 78 along a length substantially equal to the diameter of same. According to other alternative embodiments, the guide notch 79 may be slightly flared towards the upper surface of the guide cheek 78.

The stiffening ribs 70 described above opposition between the guide cheek 78 and the lateral flanks 75 to strengthen the second attachment member 72. The stiffening ribs 70 lie within respective planes that are parallel to the transverse plane of symmetry $P_5$.

The invention claimed is:

1. An adapter interposed between a connector and an end portion of a drive arm, the adapter comprising:
   a first attachment member configured to cooperate with a second attachment member of the connector, the first attachment member having at least one attachment wall arranged in a longitudinal plane of the adapter that bears a pivot shaft of the adapter, wherein the at least one attachment wall has at least one recess for receiving a stiffening rib of the connector;

a body wall that is U-shaped in a cross-section, wherein the body wall comprises an upper body portion extending in a plane parallel to a longitudinal horizontal plane of the adapter, and two side body portions parallel to one another that extend in a respective plane parallel to a longitudinal vertical plane of the adapter, wherein the first attachment member comprises a base carried by an internal face of the upper body portion, wherein the first attachment member is interposed between the two side body portions, wherein the adapter has a foot that has at least one flexible tab provided with a pad, and wherein the pad emerges above the upper body portion of the body wall.

2. The adapter according to claim 1, wherein the attachment wall has two recesses arranged on either side of the pivot shaft.

3. The adapter according to claim 2, wherein the recesses flank the pivot shaft.

4. The adapter according to claim 1, wherein the pivot shaft is formed by at least two strands respectively arranged on two attachment walls.

5. The adapter according to claim 1, wherein the adapter includes a head with a front wall provided with a front notch.

6. The adapter according to claim 1, wherein the flexible tab is provided with at least one buttress extending between the flexible tab and the foot of the adapter.

7. The adapter according to claim 6, wherein the longitudinal section of the buttress is triangular.

8. The adapter according to claim 1, including at least one side tab that tilts about a tilting axis that is perpendicular to a longitudinal axis of the adapter.

9. A wiper blade and adapter according to claim 1.

10. An assembly formed by the connector and the adapter according to claim 1, wherein the recess forms a stop seat for the stiffening rib of the connector.

11. The assembly according to claim 10, wherein the recess and an upper end of the stiffening rib form means for determining a tilt angle of the connector in relation to the adapter.

12. A wiping system including the assembly according to claim 11, including a wiper blade attached to the connector and the end portion of the drive arm to which the adapter is affixed.

* * * * *